(12) United States Patent
Wu et al.

(10) Patent No.: US 7,340,130 B1
(45) Date of Patent: Mar. 4, 2008

(54) METHOD FOR ASSEMBLY OF MULTI-PORTS OPTICAL APPARATUS

(75) Inventors: Xuehua Wu, Union City, CA (US); Mingjun Zhao, Fremont, CA (US); John Feng, Union City, CA (US)

(73) Assignee: Avanex Corporation, Fremont, CA (US)

( * ) Notice: Subject to any disclaimer, the term of this patent is extended or adjusted under 35 U.S.C. 154(b) by 175 days.

(21) Appl. No.: 11/247,779

(22) Filed: Oct. 11, 2005

(51) Int. Cl.
*G02B 6/34* (2006.01)
(52) U.S. Cl. ............................. 385/34; 385/33; 385/84
(58) Field of Classification Search ................. 385/33, 385/84
See application file for complete search history.

(56) References Cited

U.S. PATENT DOCUMENTS

| | | | | |
|---|---|---|---|---|
| 5,555,330 | A * | 9/1996 | Pan et al. | 385/39 |
| 7,171,073 | B1 * | 1/2007 | Wu et al. | 385/24 |
| 2002/0118920 | A1 * | 8/2002 | Francis et al. | 385/33 |
| 2002/0197020 | A1 * | 12/2002 | Qian et al. | 385/80 |
| 2003/0108297 | A1 * | 6/2003 | Lee | 385/47 |
| 2003/0185507 | A1 * | 10/2003 | Lai et al. | 385/33 |
| 2005/0008292 | A1 * | 1/2005 | Wang et al. | 385/33 |
| 2007/0127867 | A1 * | 6/2007 | Jin et al. | 385/27 |

* cited by examiner

*Primary Examiner*—Frank G. Font
*Assistant Examiner*—Eric Wong
(74) *Attorney, Agent, or Firm*—Patterson & Sheridan, LLP (57) ABSTRACT

The present invention describes a structure and method for a multi-ports WDM device for compensating the filter distortion while reducing insertion loss. The multi-ports WDM device comprises a 4-fiber collimator having a grin lens and a 2-fiber collimator having a lens where the focal plane of the second lens is shorter than the focal plane of the first grin lens Ands with aspheric surface. When a light signal travels through the first lens in the 4-fiber collimator to a filter, the film on the filter causes distortion to the light signal resulting in a large insertion loss. To compensate for the insertion loss, the lens on the 2-fiber collimator has a aspheric function and a shorter focal plane than the grin lens on the 4-fiber collimator. The type of grin lens used in the 4-fiber collimator is different than the lens used in the 2-fiber collimator. Effectively, the lens in the 2-fiber collimator operates to de-focus a light signal relative to the grin lens in the 4-fiber collimator.

20 Claims, 9 Drawing Sheets

METHOD FOR ASSEMBLY OF MULTI-PORTS OPTICAL APPARATUS

CROSS REFERENCE TO RELATED APPLICATIONS

This application relates to a concurrently filed U.S. patent application Ser. No. 11/247,052, entitled "Structure and Method for Multi-Ports Optical Apparatus" by Xuehua Wu et al., filed on Oct. 11, 2005, owned by the assignee of this application and incorporated herein by reference.

BACKGROUND OF THE INVENTION

1. Field of Invention

The invention relates generally to optical technologies and more particularly to an optical Wavelength Division Multiplexing (WDM) devices with multiple ports.

2. Description of Related Art

Fiber optic networks are becoming increasingly popular for data transmission due to their high speed and high data capacity capabilities. Multiple wavelengths may be transmitted along the same optical fiber. This totality of multiple combined wavelengths comprises a single composite transmitted signal. A crucial feature of a fiber optic network is the separation of the optical signal into its single wavelengths, or "channels", typically by a dense wavelength division multiplexer. This separation must occur in order for the exchange of wavelengths between signals on "loops" within networks to occur. The exchange occurs at connector points, or points where two or more loops intersect for the purpose of exchanging wavelengths.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop.

Traditional methods used by dense wavelength division multiplexers in separating an optical signal into its single channels include the use of filters and fiber gratings as separators. A "separator," as the term is used in this specification, is an integrated collection of optical components functioning as a unit which separates one or more channels from an optical signal. Filters allow a target channel to pass through while redirecting all other channels. Fiber gratings target a channel to be reflected while all other channels pass through. Both filters and fiber gratings are well known in the optical art.

In a conventional solution, a WDM device comprises two collimators where both collimators employ the same type of grin lens for processing a light signal. While this structure may provide sufficient performance for a coarse wdm as well as 400 GHz and 200 GHz filter, as the level of the filter increases, the coupling effect between the two collimators in the WDM device will likely produce a significant amount of distortion, resulting in poor insertion loss. Accordingly, it is desirable to have a WDM device that compensates for filter distortion, thereby reducing the amount of insertion loss.

SUMMARY OF THE INVENTION

The present invention describes a structure and method for a multi-ports WDM device for compensating the filter distortion while reducing insertion loss. The multi-ports WDM device comprises a 4-fiber collimator having a first type of grin lens and a 2-fiber collimator having a second type of grin lens where the focal plane of the second type of grin lens is a different type of design from the first type of grin lens in the 4-fiber collimator When a light signal travels through the first grin lens in the 4-fiber collimator to a filter, the film on the filter causes distortion to the light signal resulting in an undesirable and large insertion loss. To compensate for the insertion loss, the second type of grin lens on the 2-fiber collimator has a shorter focal plane and aspheric function relative to the first type of grin lens in the 4-fiber collimator. Suitable selections of the second type of grin lens include a gradium lens, an aspheric lens, and a grin lens that provides a shorter focal plane than the first grin lens. Other type of lens that has the characteristic of a shorter focal plane may be used without departing from the spirits of the present invention. Therefore, the type of grin lens used in the 4-fiber collimator is different than the grin lens used in the 2-fiber collimator. Effectively, the grin lens in the 2-fiber collimator operates to de-focus a light signal relative to the grin lens in the 4-fiber collimator. One suitable implementation of the second type of grin lens in the 2-fiber collimator is a gradium lens.

Broadly stated, claim 1 recites a method for assembling a multi-port WDM device having a grin lens having a first principle face and a second principle face, that comprises assembling a m-fiber collimator (m is an even integer number), comprising: attaching a filter to the second principle face of the grin lens; attaching a m-fiber pigtail to the first principle face of the grin lens; and placing a glass tube over the attached m-fiber pigtail, the grin lens, and the filter, the glass tube extending along the surface of the m-fiber pigtail; assembling a n-fiber collimator (n=m/2), comprising: placing a second glass tube over a lens and extending beyond the lens; and inserting a n-fiber pigtail into the glass tube and attaching the n-fiber pigtail to the lens.

Advantageously, the present invention compensates for the insertion loss caused by a filter distortion when a light signal travels through the grin lens in a first collimator, which allows the use of a thicker coated film filter for the design in a multi-ports WDM device. Another advantage of all glass packaging WDM device is the desirable characteristics in the parameter of temperature dependent loss (TDL), saving the materials and the time period for development of WDM device relative with metal soldering WDM devices.

The other structures and methods regarding to the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

Reference symbols or names are used in the Figures to indicate certain components, aspects or features therein, with reference symbols common to more than one Figure indicating like components, aspects of features shown therein.

DETAILED DESCRIPTION OF PREFERRED EMBODIMENT(S)

Figure 1:
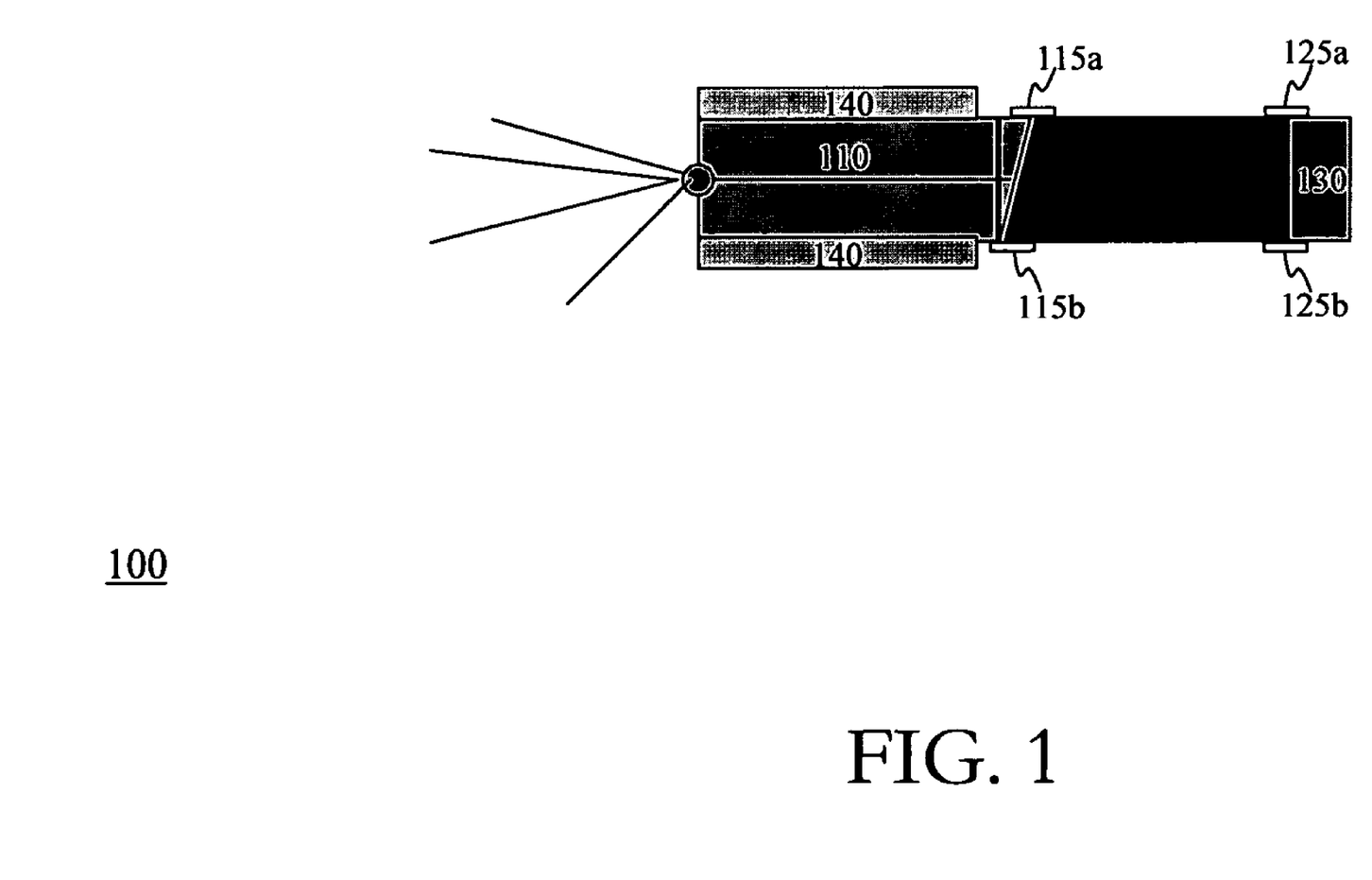
FIG. 1 is a pictorial diagram illustrating a 4-fiber collimator for assembly in a six-ports WDM device in accordance with the present invention.
Figure 3:
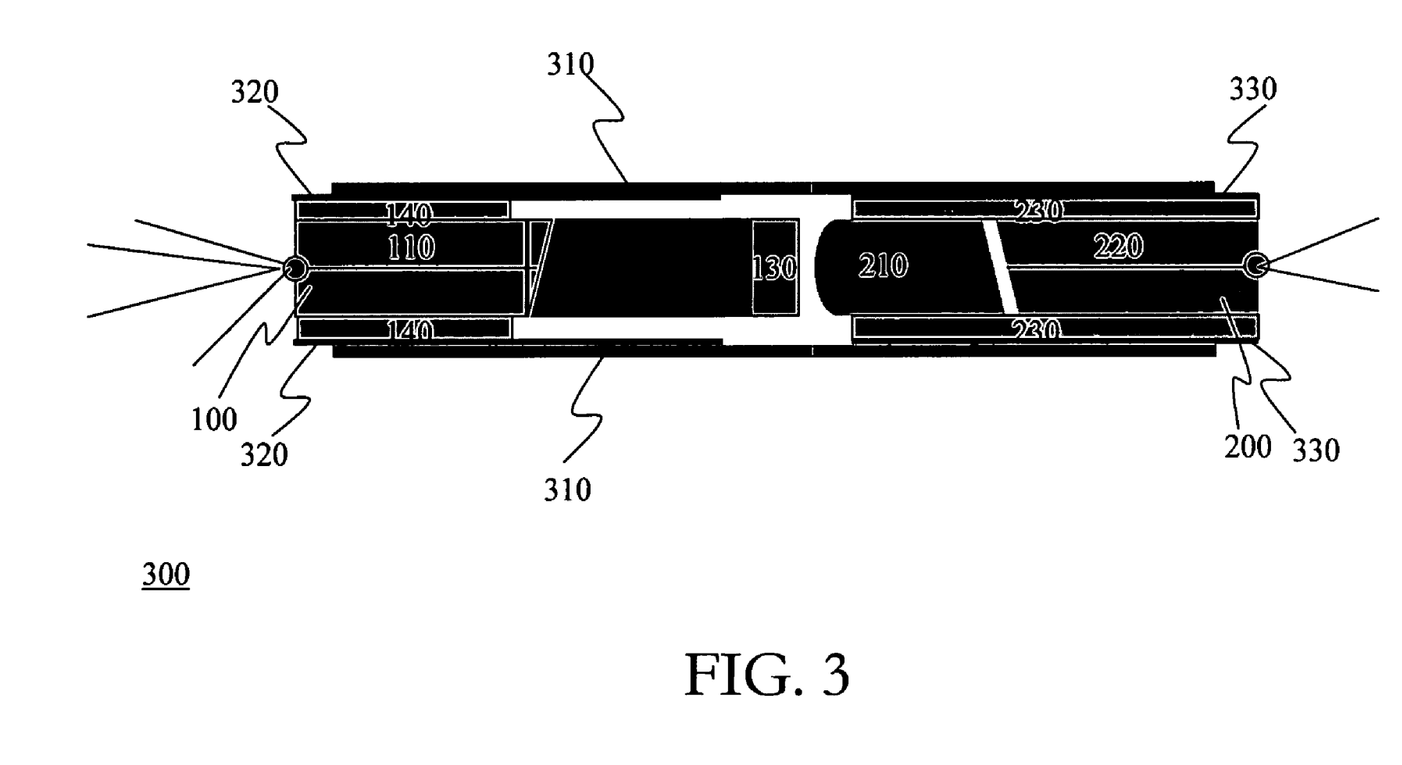
FIG. 3 is a pictorial diagram illustrating the six-ports WDM device assembled with the 4-fiber collimator coupled to the 2-fiber collimator in accordance with the present invention.

Referring now to FIG. 1, there is shown a pictorial diagram illustrating a 4-fiber collimator 100 for assembly in a six-port WDM device 300, as shown in FIG. 3. The 4-fiber collimator 100 comprises a 4-fiber pigtail 110, a grin lens 120 and a filter 130. The 4-fiber pigtail 110 has four ports on one side and adjoins on the other side to the grin lens 120 with the use of an epoxy 115a and an epoxy 115b. The grin lens 120 in turn adjoins to the filter 130 with an epoxy 125a and an epoxy 125b on bottom. In this embodiment, a short glass tube 140 with a hollow core is used to wrap around a portion of the 4-fiber pigtail 110. One of ordinary skill in the art should recognize that a different length of glass tube, or other type of materials, such as metal, can be used to wrap around all, more than, or less than the 4-fiber pigtail 110. Alternatively, the filter 130 can be implemented as a filter chip.

Figure 2:
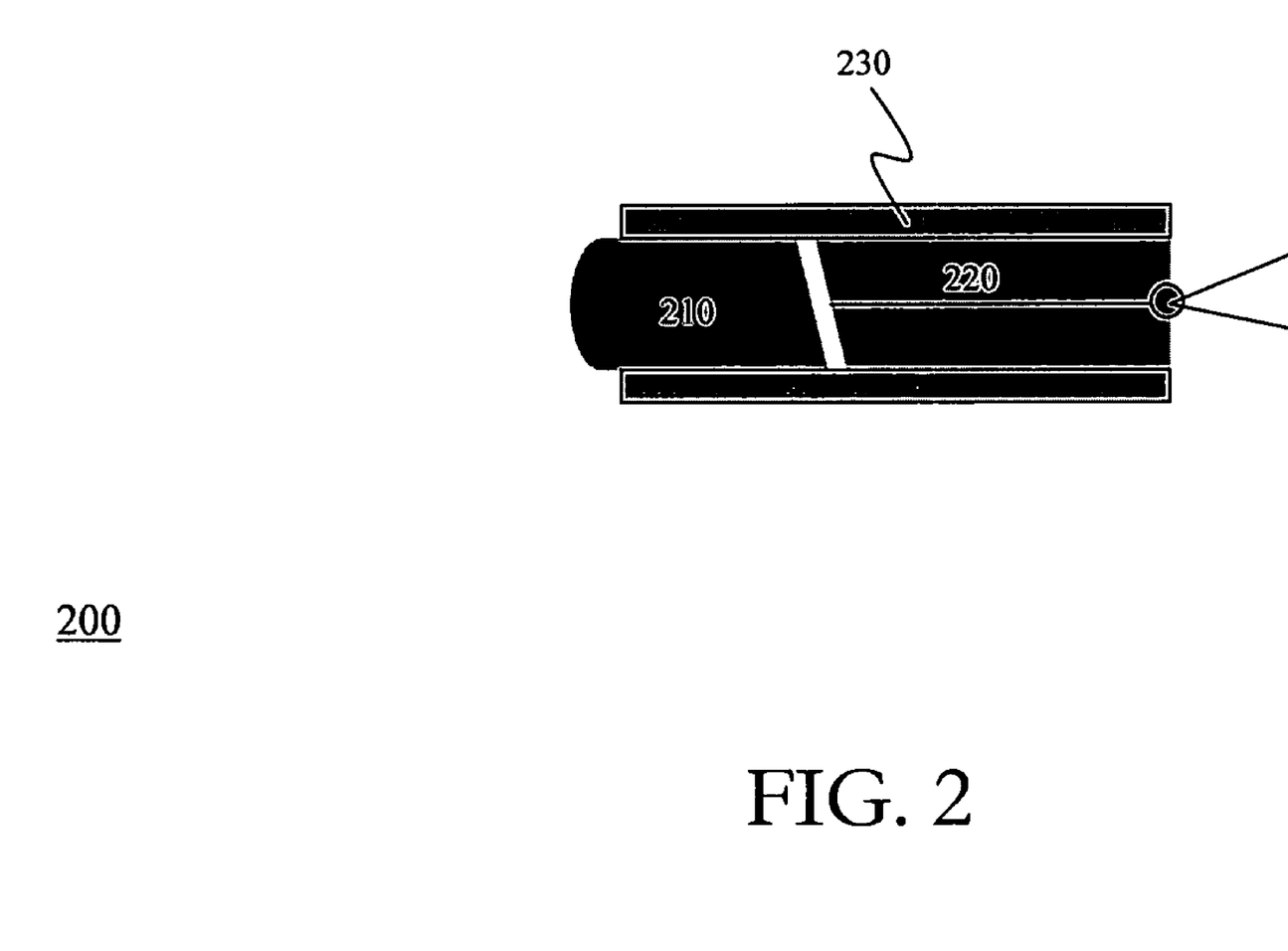
FIG. 2 is a pictorial diagram illustrating a 2-fiber collimator for assembly in the six-ports WDM device in accordance with the present invention.

In FIG. 2, there is shown a pictorial diagram illustrating a 2-fiber collimator 200 for coupling to the 4-fiber collimator 100 for assembly in the six-ports WDM device 300. The 2-fiber collimator 200 comprises a lens 210, a 2-fiber pigtail 220, and a glass tube 230. The lens 210 is preferably selected to have aspheric function and a shorter focal plane than the grin lens 120. A suitable example of the lens 210 is a gradium lens. An optional glass tube 230 with a hollow core can be used to wrap around the 2-fiber pigtail 220. In this embodiment, the optional glass tube 230 extends across the body of the lens 210 and the two-fiber pigtail 220. The short glass tube 140 has a shorter tube length that extends across the 4-fiber pigtail relative to the glass tube 230.

When applying an epoxy between the housing glass tube 310 and the short glass tube 140, and when applying an epoxy between the housing glass tube 310 and the glass tube 230, an UV light is directed toward the epoxy areas followed by hot temperature baking, resulting in curing of epoxy areas without affecting the original alignment or the optical performance including insertion loss.

FIG. 3 is shown a pictorial diagram illustrating the assembled six-ports WDM device 300 comprising the 4-fiber collimator 100 and the 2-fiber collimator 200. If a thin film filter is implemented in the filter 130, an optical signal is likely to be able to maintain the integrity of the original light signal when traveling through the fiber collimator 100. However, when the film thickness increases on the filter 130, such as more than 100 GHz coating filter, then the optical signal beam shape will likely be distorted by the filter 130 when the light beam shape travels from the 4-fiber collimator 100 to the 2-fiber collimator 200. To compensate for the distortion that may be caused by the filter 130, the lens 210 used in the 2-fiber collimator 200 is preferably different from the grin 120 that is used in the 4-fiber collimator 100. Preferably, the aspheric surface and the focal plane on the lens 220 is shorter than the focal plane on the grin lens 120 so that optical signal traveling through the filter 130, even if distorted, is compensated by the lens 210 and properly alignment processing.

The 4-fiber collimator 100 is placed adjacent to the 2-fiber collimator 200 in a housing 310. The housing 310 can be selected as a glass package or a soldering package. In the soldering package, the selected type of material is metal for the housing 310 with an interior stainless steel tubes (SST) 320 and 330. In the glass package, the selected type of material is glass, which does not need the stainless steel tubes 320 and 330. Other types of materials can also be selected to manufacture the housing 310 without departing from the spirits of the present invention.

Figure 4:
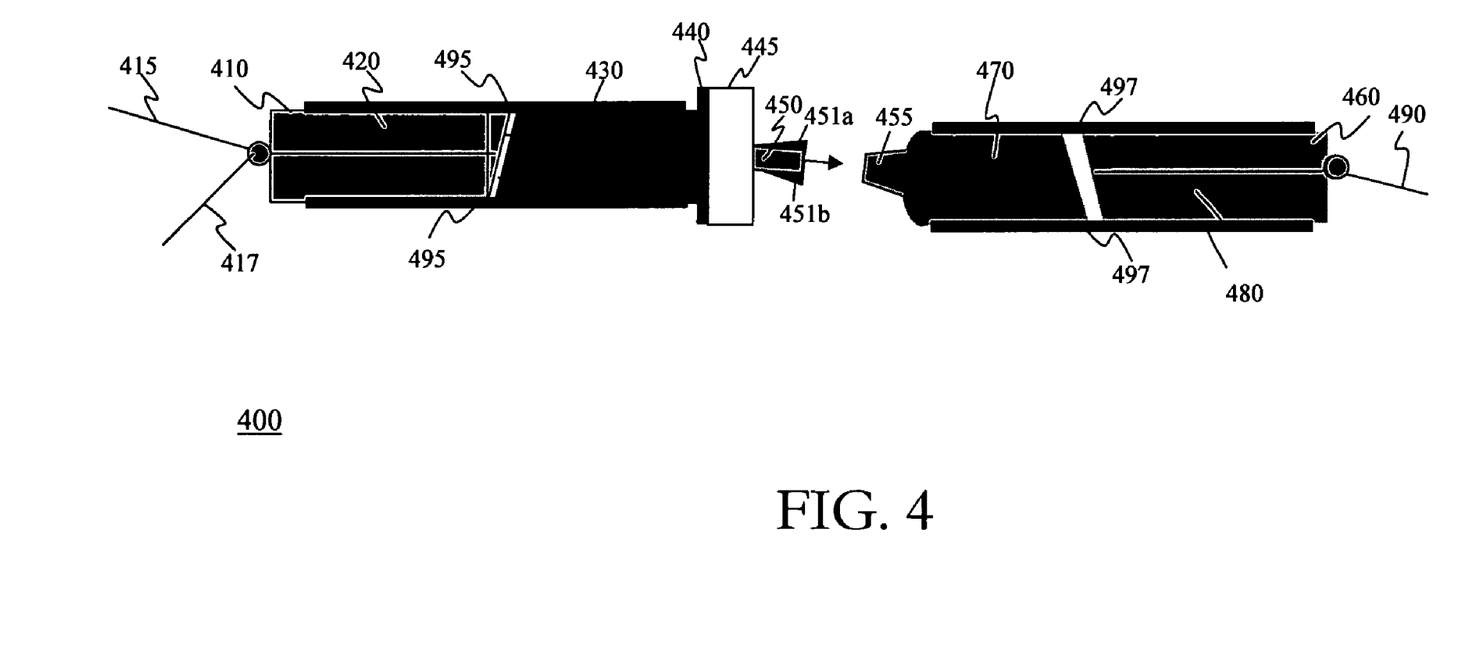
FIG. 4 is a pictorial diagram illustrating the WDM device with a distorted beam projected from a filter in the 4-fiber collimator that is compensated by a lens in the 2-fiber collimator in accordance with the present invention.

In FIG. 4, there is shown a pictorial diagram illustrating an example of a WDM device 400 with a distorted beam projected from a filter in a first collimator 410 which is compensated by a different type of lens in a second collimator 450. The first collimator 410 comprises a first port 415 and a second port 417 attached to a pigtail 420, which in turn couples to a first type of grin lens 430, which in turn couples to a filter 440 with a coating film, which in turn attaches to a substrate 445. The second collimator 460, comprises a second type of lens 470, a pigtail 480 and a third port 490. In this illustration, the filter 440 selected in this design causes a beam distortion, which is shown in FIG. 4 with a typical collimated beam 450 and distorted beams 451a and 451b extending outward from the side boundaries of the regular collimated beam 450. The second type of lens 470, however, has a wider receiving area, shown here in a defocused beam shape rather than a typical collimated shape, for receiving both the regular projected beam 450 as well as the distorted beams 451a and 451b.

Figure 5A:
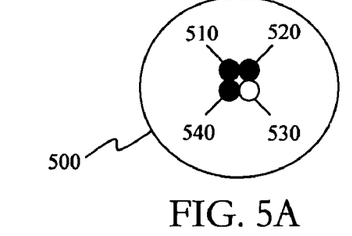
FIG. 5A is a side view illustrating a 4-ports WDM device in accordance with the present invention.
Figure 5B:
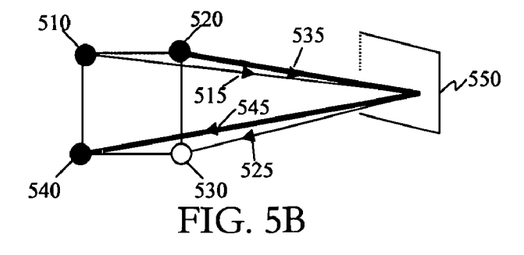
FIG. 5B is a pictorial diagram illustrating light signal projections from the 4-port input to a filter in accordance with the present invention.
Figure 6:
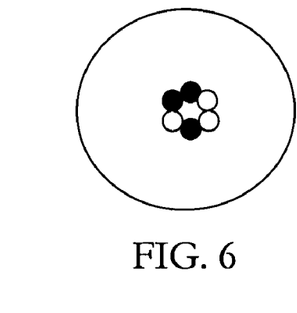
FIG. 6 is a side view illustrating a 6-ports pigtail-collimator in a 9 port WDM device in accordance with the present invention.
Figure 7:
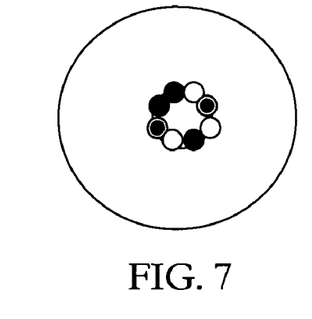
FIG. 7 is a side view illustrating an 8-ports pigtail-collimator in a 12 port WDM device in accordance with the present invention.

Turning now to FIG. 5A, there is a perspective view illustrating a 4-port pigtail collimator 500 comprising a first input port 510, a second input port 520, a first reflection port 530 and a second reflection port 540. An incoming light signal entering into the first input port 510 is reflected to the first reflection port 530. Similarly, the light signal entering into the second input port 520 will be reflected to the second reflection port 540. The light signal projections for the two input ports 510 and 520 are further depicted in a graphical diagram in FIG. 5B. The light signal entering the first input port 510 is projected onto and reflected off a filter 550 to the first reflecting port 530, as indicated from a first arrow 515 from the first input port 510 and a second arrow 525 entering the first reflecting port 530. As for the second input port 520, the light signal entering the second input port 520 is projected onto and reflected off the filter 550 to the second reflecting port 540, as indicated from a third arrow 535 from the second input port 520 and a fourth arrow 545 entering the second reflecting port 540. One of ordinary skill in the art should recognize that the present invention is applicable to other multi-port pigtail device, such as a nine-port pigtail as shown in FIG. 6 and a twelve-port pigtail as shown in FIG. 7.

Figure 8:
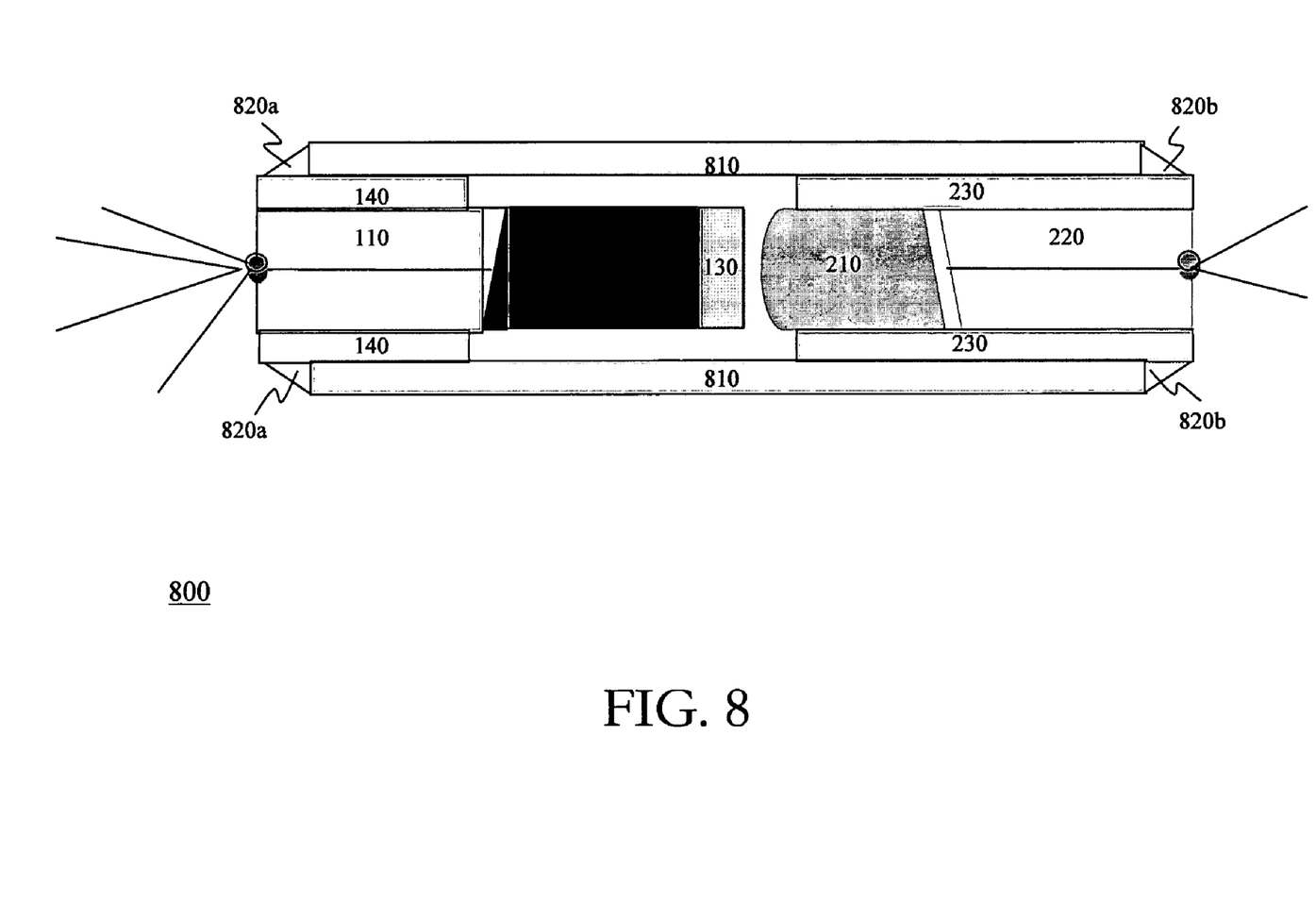
FIG. 8 is a pictorial diagram illustrating a glass package of the 6-port WDM device structure in accordance with the present invention.

Turning now to FIG. 8, there is shown a pictorial diagram illustrating a glass package of a 6-port WDM device structure 800. The two primary components, the 4-fiber collimator 100 and the 2-fiber collimator 200 are placed in a glass tube 810 for packaging. In this embodiment, the 4-fiber collimator 100 is placed in the glass tube 140 first before inserting the glass tube 140 into the glass tube 810. The 2-fiber collimator 200 is placed in the glass tube 230 first before inserting the glass tube 230 into the glass tube 810. An epoxy 820*a* is used in the left end as an adhesion to hold the glass tube 140 to the glass tube 810. An epoxy 820*b* is used in the right end as an adhesion to hold the glass tube 230 to the glass tube 810. And also an epoxy applied in the gap between the glass tube 810 and 140, as well as the glass tube 810 and 230.

Figure 9:
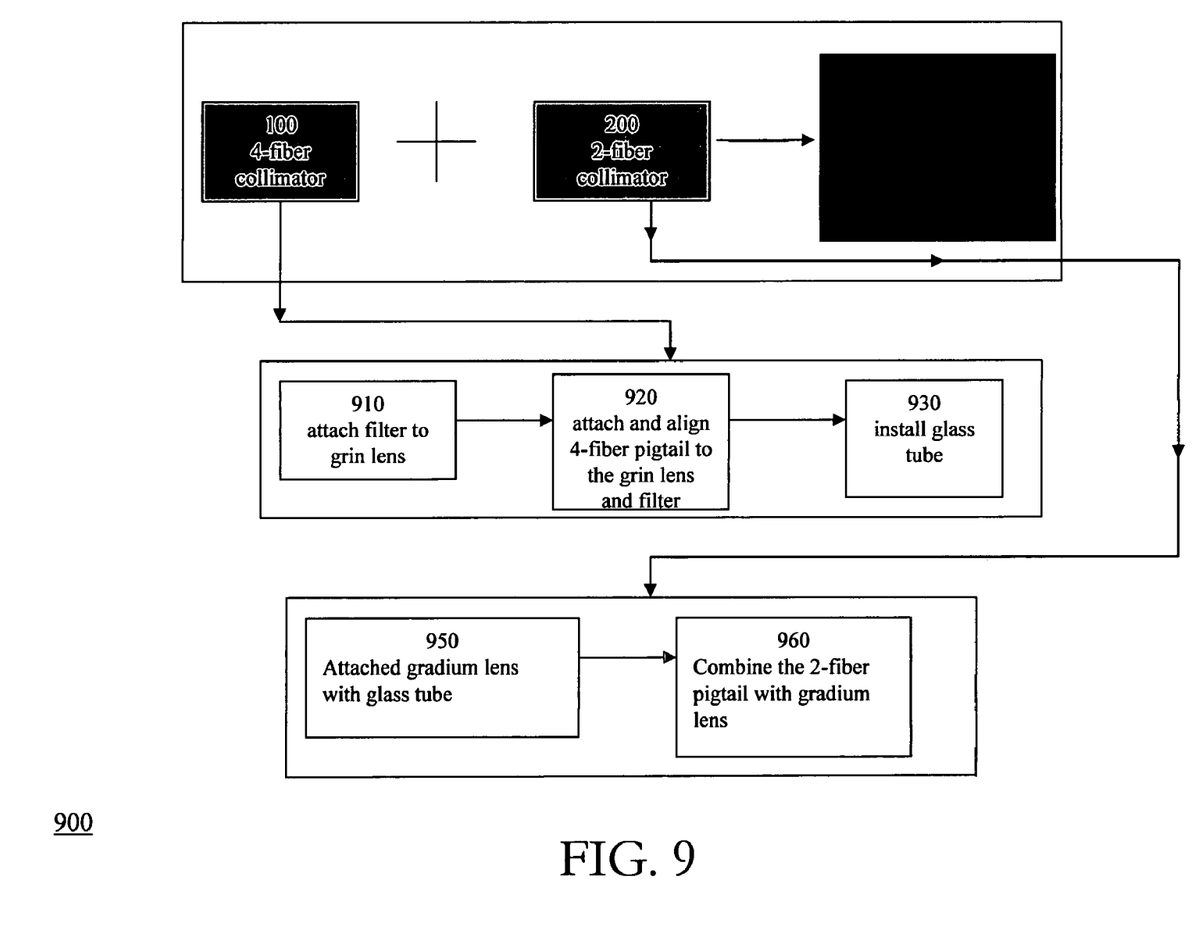
FIG. 9 is a flow diagram illustrating the process in the assembly of the glass package in the 6-port WDM device structure in accordance with the present invention.

In FIG. 9, there is shown a flow diagram illustrating the assembly process 900 in the assembly of the glass package in the 6-port WDM device structure 800. The 6-port WDM multi-port device 800 is constructed mainly from two parts, the 4-fiber collimator 100 and the 2-fiber collimator 200. In assembling the 4-fiber collimator 100, at step 910, the filter 130 is attached to the grin lens 120 with an adhesive material, such as epoxy. At step 920, the 4-fiber pigtail 110 is attached and aligned with the grin lens 120 and the filter 130. At step 930, the process 900 installs the glass tube 140 over the 4-fiber pigtail 110. As an alternative embodiment, a glass tube can be used in place of the stainless steel tube for packaging the 4-fiber collimator 100 and the 2-fiber collimator 200. Similarly, the assembly for the other part, the 2-fiber collimator 200, begins by placing the lens 210, such as a lens, in the glass tube 230 at step 950. At step 960, the 2-fiber pigtail 220 is attached to the lens 210. The 4-fiber collimator 100 having a first type of lens is aligned with a second type of lens in the 2-fiber collimator 200 to produce the multi-ports WDM device 980.

When metal is selected for packaging the 4-fiber collimator 100 and the 2-fiber collimator 200, the adhesive material used to hold the 4-fiber collimator 100 and the 2-fiber collimator 200 to the metal packaging is soldering. However, both collimators are needed to put on the stainless steel tubes as shown in FIG. 3. When glass is selected for packaging the 4-fiber collimator 100 and the 2-fiber collimator 200, the adhesive material used to hold the 4-fiber collimator 100 and the 2-fiber collimator to the metal packaging is epoxy.

Figure 10A:
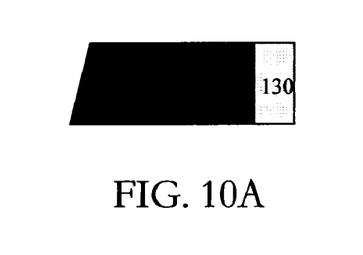
FIGS. 10A-10D are pictorial diagrams illustrating the process steps in the assembly of the 4-fiber collimator in accordance with the present invention.
Figure 10B:
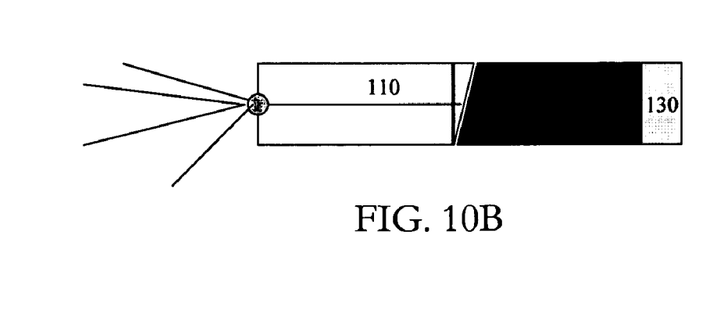
Figure 10C:
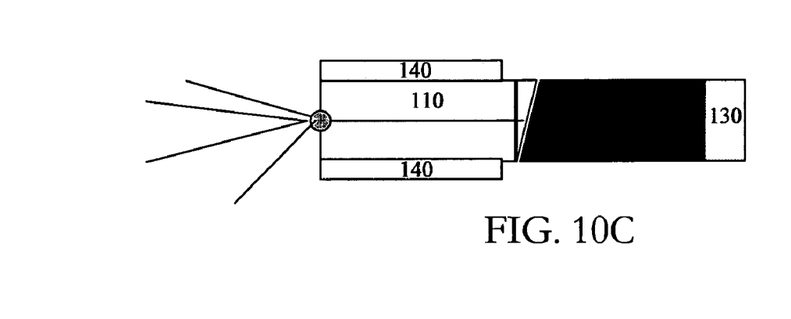
Figure 10D:
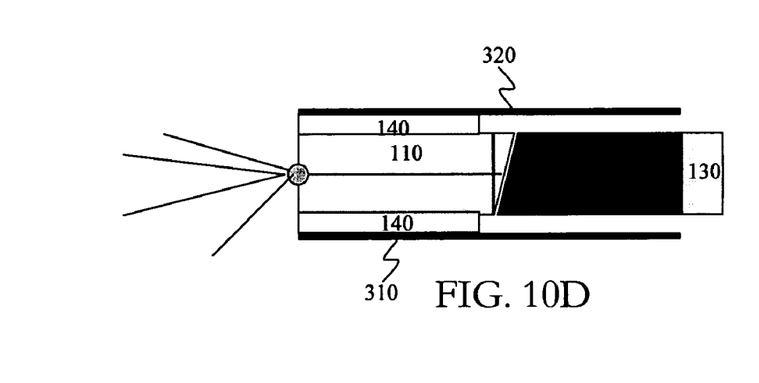

In FIGS. 10A-10D, there are shown pictorial diagrams illustrating the process steps in the assembly of the 4-fiber collimator 100. In the first step as shown in FIG. 10A, the grin lens 120 adjoins to the filter 130 using an adhesive material such as epoxy. In the second step as shown in FIG. 10B, the 4-fiber pigtail 110 is adjoined to the grin lens 120. In the third step, the short glass tube 140 with a hollow core is used to wrap around a portion of the 4-fiber pigtail 110, as shown in FIG. 10C. The 4-fiber collimator 100 is placed inside the housing 310 in the fourth step as shown in FIG. 10D for soldering type use.

Figure 11A:
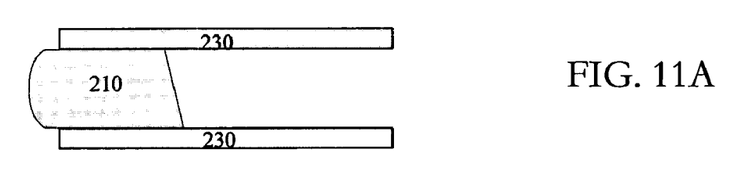
FIGS. 11A-11C are pictorial diagrams illustrating the process steps in the assembly of the 2-fiber collimator in accordance with the present invention.
Figure 11B:
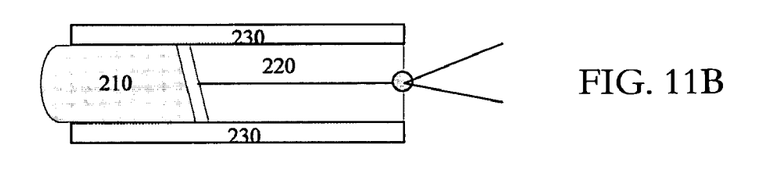
Figure 11C:
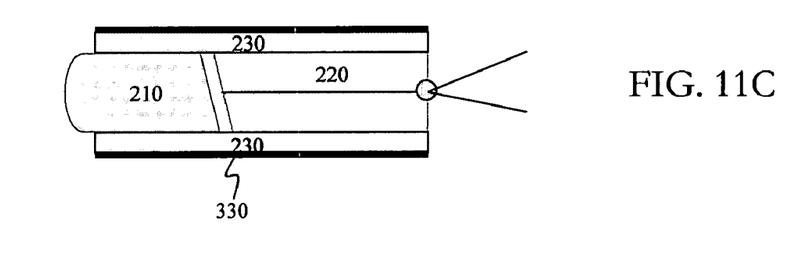

FIGS. 11A-11C are pictorial diagrams illustrating the process steps in the assembly of the 2-fiber collimator 200. In the first step as shown in FIG. 11A, the lens 210 is placed in the glass tube 230. In the second step as shown in FIG. 11B, the 2-fiber pigtail 220 is then attached to the lens 210 and inside the glass tube 230. The 2-fiber collimator 200 is subsequently placed inside the housing 310 (as shown in FIG. 3) in the third step as shown in FIG. 11C, which can be selected as a glass package or a soldering package. In the soldering package, the selected type of material is metal for the housing 310 with an interior stainless steel tubes (SSD) 320 and 330. In the glass package, the selected type of material is glass, which does not need the stainless steel tubes 320 and 330.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

We claim:

1. A method for assembling a multi-port WDM device, comprising:
   assembling a m-fiber collimator, comprising:
      attaching a filter to a face of a grin lens;
      attaching a m-fiber pigtail to another face of the grin lens; and
      placing a first glass tube over the attached m-fiber pigtail, the grin lens, and the filter, the glass tube extending along the surface of the m-fiber pigtail;
   assembling a n-fiber collimator, comprising:
      placing a second glass tube over a lens and extending beyond the lens; and
      inserting a n-fiber pigtail into the glass tube and attaching the n-fiber pigtail to the lens, wherein the n-fiber defines a first number of fibers and the m-fiber defines a second number of fibers; and
   placing a glass housing over the m-fiber collimator and the n-fiber collimator.

2. The method of claim 1, further comprising placing a first stainless steel tube over the first glass tube, the m-fiber pigtail, the grin lens, and the filter for soldering packing.

3. The method of claim 1, further comprising placing a second stainless steel tube over the second glass tube, the n-fiber pigtail and, the lens.

4. The method of claim 1, wherein the first stainless glass tube is shorter than the second stainless glass tube.

5. The method of claim 1, further comprising aligning the m-fiber collimator with the n-fiber collimator where the grin lens in the m-fiber collimator represents a different type of lens from the lens in the n-fiber collimator.

6. The method of claim 1, further comprising applying an epoxy between the glass housing and the first glass tube, and applying an epoxy between the glass housing and the second glass tube.

7. The method of claim 6, further comprising directing an UV light toward the epoxy areas; hot temperature baking of the epoxy areas; and curing the epoxy areas without affecting the original alignment or the optical performance.

8. A method for assembling a multi-port WDM device having a grin lens having a first principle face and a second principle face, comprising:
   assembling a m-fiber collimator, comprising:
      attaching a filter to the second principle face of the grin lens;

attaching a m-fiber pigtail to the first principle face of the grin lens; and placing a glass tube over the attached m-fiber pigtail, the grin lens, and the filter, the glass tube extending along the surface of the m-fiber pigtail;

assembling a n-fiber collimator, comprising:

placing a second glass tube over a lens and extending beyond the lens, wherein the lens has a focal plane shorter than a focal plane of the grin lens; and inserting a n-fiber pigtail into the second glass tube and attaching the n-fiber pigtail to the lens, wherein the n-fiber defines a first number of fibers and the m-fiber defines a second number of fibers.

9. The method of claim 8, further comprising aligning the m-fiber collimator with the n-fiber collimator wherein the grin lens in the m-fiber collimator represents a different type of lens from the lens in the n-fiber collimator.

10. A method for assembling a multi-port WDM device, comprising:

assembling a m-fiber collimator, comprising:

attaching a filter to a face of a grin lens;

attaching a m-fiber pigtail to another face of the grin lens; and placing a first glass tube over the attached m-fiber pigtail, the grin lens, and the filter, the glass tube extending along the surface of the m-fiber pigtail;

a first stainless steel tube over the first glass tube, the m-fiber pigtail, the grin lens, and the filter;

assembling a n-fiber collimator, comprising:

placing a second glass tube over a lens and extending beyond the lens, wherein the lens has a focal plane shorter than a focal plane of the grin lens;

inserting a n-fiber pigtail into the glass tube and attaching the n-fiber pigtail to the lens, wherein the n-fiber defines a first number of fibers and the m-fiber defines a second number of fibers;

placing a second stainless steel tube over the second glass tube, the n-fiber pigtail and the lens; and placing a metal housing over the m-fiber collimator and the n-fiber collimator.

11. The method of claim 10, wherein the lens has an aspheric surface.

12. The method of claim 1, wherein the glass housing is configured to couple the m-fiber collimator to the n-fiber collimator.

13. The method of claim 1, wherein the lens comprises an aspheric lens.

14. The method of claim 1, wherein the combination of the m-fiber collimator and the n-fiber collimator produces a 6-ports WDM device.

15. The method of claim 1, wherein the combination of the m-fiber collimator and the n-fiber collimator produces a 9-ports WDM device.

16. The method of claim 1, wherein the combination of the m-fiber collimator and the n-fiber collimator produces a 12-ports WDM device.

17. The method of claim 1, wherein the lens has a focal plane shorter than a focal plane of the grin lens.

18. The method of claim 8, wherein the lens has an aspheric surface.

19. The method of claim 8, wherein the lens comprises an aspheric lens.

20. The method of claim 8, wherein the lens comprises a gradium lens.

* * * * *